United States Patent [19]

Terasawa

[11] Patent Number: 4,628,333

[45] Date of Patent: Dec. 9, 1986

[54] INK JET RECORDING HEAD AND INK JET RECORDER

[75] Inventor: Koji Terasawa, Mitaka, Japan

[73] Assignee: Canon Kabushiki Kaisha, Tokyo, Japan

[21] Appl. No.: 679,405

[22] Filed: Dec. 7, 1984

[30] Foreign Application Priority Data

| | | | |
|---|---|---|---|
| Dec. 29, 1983 | [JP] | Japan | 58-249393 |
| Dec. 29, 1983 | [JP] | Japan | 58-249394 |

[51] Int. Cl.$^4$ .......... G01D 15/18

[52] U.S. Cl. .......... 346/140 R

[58] Field of Search .......... 346/140

[56] References Cited

U.S. PATENT DOCUMENTS

| | | | |
|---|---|---|---|
| 4,187,511 | 2/1980 | Robinson | 346/140 X |
| 4,383,263 | 5/1983 | Ozawa | 346/140 |
| 4,394,669 | 7/1983 | Ozawa | 346/140 |

*Primary Examiner*—Joseph W. Hartary

*Attorney, Agent, or Firm*—Fitzpatrick, Cella, Harper & Scinto

[57] ABSTRACT

An ink jet recording head has a nozzle for discharging ink and an ink chamber for supplying ink to the nozzle. A valve mechanism actuated by a vacuum force is arranged in the ink chamber in which an air layer is created as the ink is supplied into the ink chamber.

11 Claims, 14 Drawing Figures

INK JET RECORDING HEAD AND INK JET RECORDER

BACKGROUND OF THE INVENTION

1. Field of the Invention

The present invention relates to an ink jet recording head and an ink jet recorder, and more particularly to an ink jet recording head for discharging ink supplied from an ink chamber having an air layer therein, and an ink jet recorder which evacuates air from the ink chamber of the recording head by vacuum suction.

2. Description of the Prior Art

A prior art recording head of an ink jet recorder has a common ink chamber for a plurality of nozzles. The ink chamber is moved with the head as a carriage moves. In order to relieve the impact due to reversal of the direction of movement of the carriage, the ink chamber is provided with an air layer which absorbs a momentary rise in ink pressure in the nozzle at the time of the carriage return and minimizes pressure applied to the nozzle. The quantity of the air layer required for such buffering function is usually 0.1–0.3 cc. In order to keep the volume of the air layer constant the prior art head requires air evacuation means as shown in FIGS. 1 and 2.

In FIG. 1, a head 1 having a plurality of nozzles arranged in a line is mounted on a carriage 2, which is reciprocally movable on a shaft 3. The recording head 1 has an ink chamber for supplying ink to nozzles. Ink 6 is supplied to the ink chamber through an ink supply pipe 4. An air layer 7 is formed in the head 1. In order to form the air layer 7 on the ink 6, that is, in order to keep the volume of the air layer constant, an air evacuation tube 5 is connected to air evacuation means and is movable with the carriage. Since the tube is a flexible plastic tube, the ink is readily vaporized. Further, since the tube is moved, the arrangement is complex.

In another air evacuation method, a vent valve 8 is used as shown in FIG. 2. The vent valve 8 normally seals the air layer 7 and the ink 6 by a stationary seal member 9. If vaporization of the ink increases the volume of the air layer, the vent valve 8 is pushed in the direction of the arrow, shown in FIG. 2, against the biasing force of a spring 8*b* so that the ink level is raised and the air is evacuated through a vent hole 8*a*. In this structure, however, it is very difficult to visually watch the ink level and there is a risk of contamination by leakage of the ink.

SUMMARY OF THE INVENTION

It is an object of the present invention to provide an ink jet recording head whihch maintains an air layer of a constant volume in an ink chamber to assure air evacuation and prevent air from entering into the nozzle, and provide an ink jet recorder capable of evacuating air introduced into the nozzle.

It is another object of the present invention to provide an ink jet recording head having a nozzle for discharging ink, an ink chamber for supplying ink to the nozzle and a valve mechanism actuated by vacuum mounted in the ink chamber in which an air layer is formed by the supply of ink.

It is other object of the present invention to provide an ink jet recorder having an ink jet recording head including a nozzle for discharging ink, an ink chamber for supplying the ink to the nozzle and a valve mechanism actuated by vacuum mounted in the ink chamber in which an air layer is formed by the supply of the ink, a cap mechanism for sealing the nozzle and an air evacuation joint mechanism connected to a vacuum source for sealing a vent hole communicating between the vacuum source and the ink chamber through the valve mechanism.

DETAILED DESCRIPTION OF THE PREFERRED EMBODIMENTS

Figure 1:
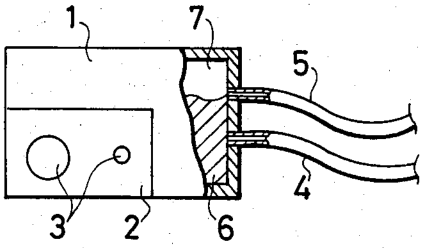
FIG. 1 PRIOR ART
FIGS. 1 and 2 show prior art recording heads.
Figure 2:
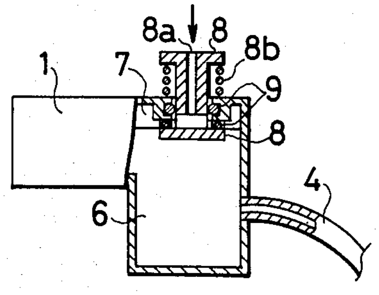
FIG. 2 PRIOR ART

FIGS. 3 to 14 show embodiments of the present invention in which like elements to those shown in FIGS. 1 and 2 are designated by like numerals and the explanations thereof are omitted.

Figure 3:
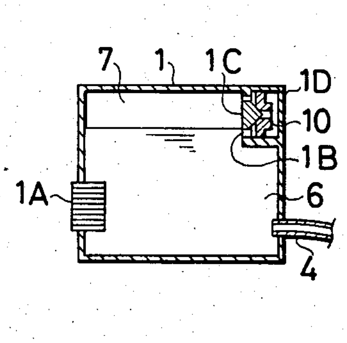
FIG. 3 is a sectional view of a recording head of the present invention.
Figure 4:
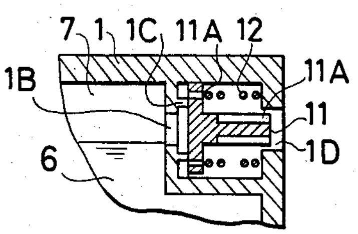
FIG. 4 is a diagram of a valve mechanism.

In FIG. 3, the recording head 1 has a nozzle 1A having a plurality of nozzle orifices, and a vent hole 1B and a valve seat 1C near the interface between the ink 6 and the air layer 7. A valve 10, which is normally contacting the valve seat 1C by virtue of a spring force, is provided. The valve 10 is made of a resilient material. When air is subjected to a vacuum through a vent hole 1D, which is an air evacuation joint to the exterior of the recording head 1, the valve 10 is deformed by the pressure difference from the air layer 7 which is at atmospheric pressure and moved off the valve seat 1C. FIG. 4 shows another embodiment of the valve. A flange of a valve shaft 11 is normally press-contacted against the valve seat 1C by a spring 12, and the valve is opened by the pressure difference between the vent portion 11A and the air layer 7 to which ink is supplied and which is at atmospheric pressure, which is caused by the vacuum suction from the vent hole 1D so that ink can be readily supplied from the ink chamber.

The flange of valve shaft 11, or valve seat 1C, may be constructed so as to be readily sealed by a rubber lining.

Figure 5:
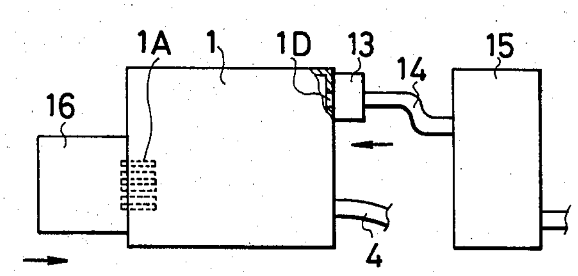
FIG. 5 is a diagram of a head.

In FIG. 5, when the air layer 7 in the recording head 1 of FIG. 3 increases, a cap 16 is moved in the direction of the arrow shown in FIG. 5 proximate to cap 16 to seal the nozzle 1A, and an air evacuation joint 13 is press-contacted to the vent opening 1D as shown by the arrow in FIG. 5 proximate to joint 13. The air evacuation joint 13 is connected to an exhaust tube 14, a vacuum source 15 and an exhausted ink reservoir (not shown). In the construction of FIG. 5, when the pressure of the air layer in the ink chamber is reduced, the ink is sucked from the ink supply pipe 4, which is connected to a main tank (not shown), so that excess air is ejected out of the record head and the ink level is raised. The opening force for the valve is determined by taking a balance with the vacuum suction force into consideration.

Figure 6:
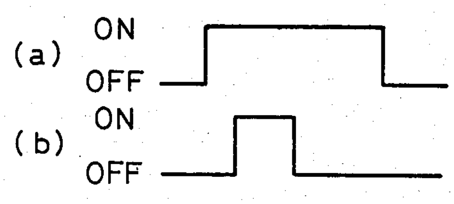
FIG. 6 is a timing chart.

The timing for the capping of the nozzle and the air evacuation is shown in FIG. 6. FIG. 6(*a*) shows the timing for the capping and FIG. 6(*b*) shows the timing for the air evacuation. The nozzle is sealed by the capping. After the nozzle is closed, the air is evacuated by the vacuum acting on the valve by the vacuum source. (Air evacuation ON). As shown in FIG. 6, the air is evacuated only during the capping so that introduction of air from the nozzle is prevented.

Figure 7:
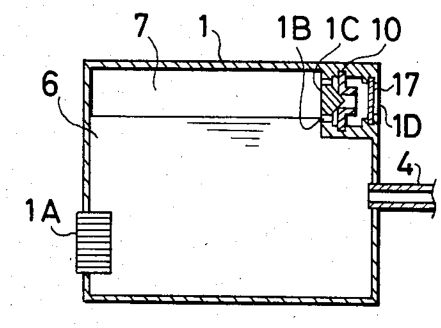
FIGS. 7 and 8 show other embodiments.

Air can be evacuated when the vacuum source is connected to the cap 16. As shown in FIG. 7, a filter 17 is provided at the air evacuation portion. As the ink level rises and reaches a level to allow the ink to be ejected from the vent hole 1D, the path of resistance of ink flow through the filter 17 increases and the path of resistance of ink flow through the nozzle relatively decreases so that ink in the nozzle is sufficiently sucked. The filter 17 may be a porous filter having a hole diameter of less than 100 μm such as a membrane filter or a ceramic filter. The filter 17 exhibits 100 times as high flow resistance to ink as it does to air so that it presents high flow resistance to the ink when the ink flows into the filter.

Figure 8:
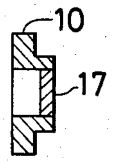

In FIG. 8, a filter is arranged in valve 10 which is made of resilient material.

Figure 9:
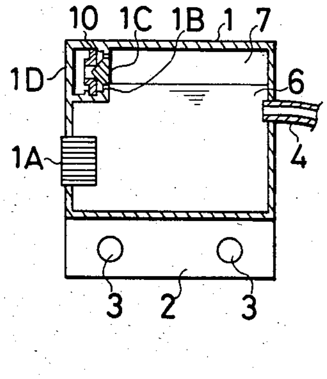
FIG. 9 is a sectional view of another recording head of the present invention.
Figure 10:
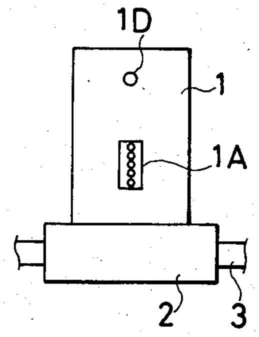
FIG. 10 is a front view of the recording head shown in FIG. 9.
Figure 11:
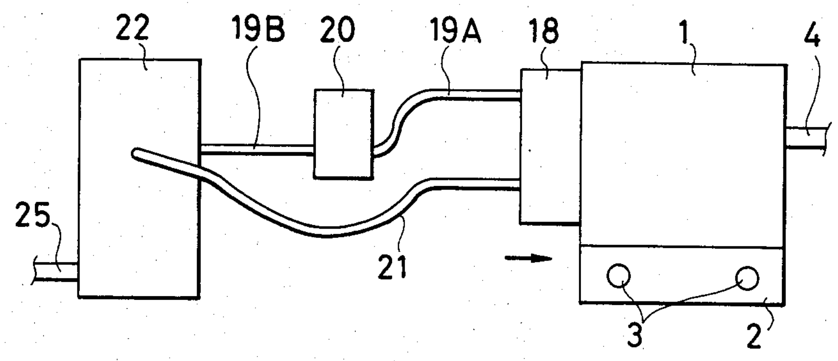
FIG. 11 shows an overall configuration.
Figure 12:
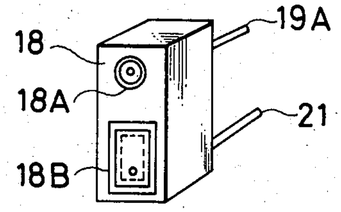
FIG. 12 is a front view of a cap.
Figure 13:
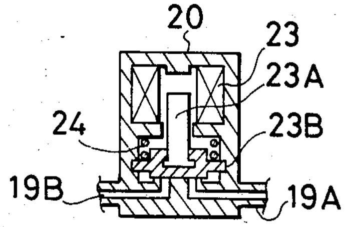
FIG. 13 shows a sectional view of a switching valve.

FIG. 9 is a sectional view of the recording head 1 of the present invention. The air evacuation valve is provided at the interface of the ink 6 and the air layer 7. The valve 10 made of the elastic material that normally contacts the valve seat 1C, and when vacuum is supplied through the vent hole 1D, the valve 10 moves off the valve seat 1C and the vacuum communicates with the air layer 7 through the vent holes 1D and 1B. The nozzle 1A is arranged below the ink chamber 6. FIG. 10 is a front view as viewed from the nozzle of FIG. 9. In FIG. 11, the recording head 1 of FIG. 9 is sealed by a cap 18 and the ink and the air are sucked through the nozzle 1A and the vent hole 1D, respectively. As shown in FIG. 12, the cap 18 comprises a hollow air evacuation elastic member 18A and a nozzle elastic member 18B, and an air evacuation suction tube 19A and 19B and a nozzle suction tube 21 connected to the vacuum source 22. A switching valve 20 is connected at the mid-point of the air evacuation suction tube. A sectional view thereof is shown in FIG. 13. A core 23A and a resilient valve 23B are movable by a solenoid 23 and the air evacuation suction tube is normally closed by a spring 24. Only when the solenoid 23 is energized will the vacuum source 22 and the air evacuation resilient member 18A communicate with each other.

The reason why it is necessary to provide the switching valve 20 is because the flow path resistance of lines 19A and 19B is designed to be much lower than the flow path resistance of the nozzle so that the air layer 7 in the ink chamber is readily evacuated by the vacuum force. If the air evacuation and the suction from the nozzle are effected, the quantity of ink sucked from the nozzle decreases, the air is introduced into the nozzle and as a result the destroyed ink discharge function of the nozzle is not readily removed.

Figure 14:
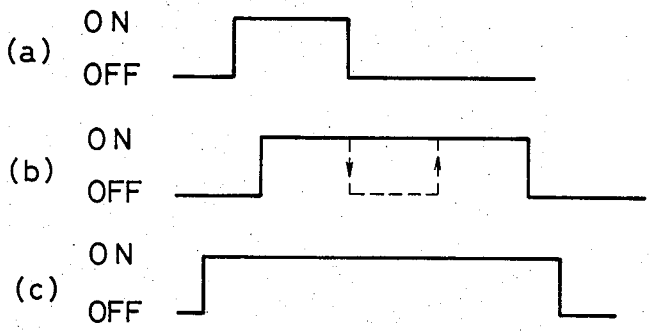
FIG. 14 is a timing chart.

In order to asssure that a sufficient amount of ink is sucked from the nozzle, the cap is moved in the direction of the arrow shown in FIG. 11 at according to the timing shown in FIG. 14 to seal the nozzle and the vent hole. The switching valve is switched to the ON position to connect the air evacuation suction tube, and the vacuum source is activated to suck the ink and the air from the recording head by vacuum force. FIG. 14(*a*) shows the timing of the switching valve, FIG. 14(*b*) shows the timing of the vacuum source, and FIG. 14(*c*) shows the timing of the cap. Since the air suction tube has a very low flow path resistance, it is blocked in a short time but the nozzle system is designed to suck for a long time to remove air bubbles in the nozzle. The connection between the vacuum source 22 and the nozzle may be repeatedly turned on and off as shown by a broken line in FIG. 14, depending on the construction of the vacuum source. Finally, the cap is opened to make the recording head ready for printing.

The connection of the vacuum source connected to the exhaust ink tube 25 and the cap is not limited to that shown in FIG. 11 but switching valves may also be provided in the air suction tube and in the nozzle suction tube so that the air suction and the nozzle suction are selectively effected.

As described hereinabove, according to the present invention, the valve mechanism and the vent hole which are opened by the vacuum force are provided in the air layer of the ink chamber, and the sealing cap for the nozzle is provided so that the air evacuation is positively effected. The leaked ink can be readily handled by the vacuum pump mechanism, and an air layer of contant volume is assured in a short time by providing the vent hole and the nozzle at the proper level and adjusting the levels of the nozzle and the vent hole. When the vacuum suction cap is pressed against the nozzle, suction of ink from the nozzle when the ink level rises is assured by providing the filter at the air evacuation vent hole. Accordingly, the discharge-recovery-property is stable and the introduction of dust from outside the recording head is prevented.

Further, in accordance with the present invention, the valve mechanism which is opened by the vacuum force is provided in the air layer of the ink chamber of the recording head to assure air evacuation through the cap together with the nozzle, and the failure to discharge due to air bubbles in the nozzle is resolved by blocking the air evacuation tube by the switching valve so that a sufficient amount of ink is sucked from the nozzle.

The ink sucked from the air evacuation tube is moved to the vacuum source by the vacuum so that contamination by the ejected ink is prevented.

What is claimed is:

1. An ink jet recording head comprising:
- a nozzle for discharging ink;
- an ink chamber for supplying ink to said nozzle; and
- a valve mechanism actuated by a vacuum arranged in said ink chamber, wherein an air layer is created in said ink chamber as ink is supplied thereto.

2. An ink jet recording head according to claim 1 wherein said nozzle is closed by a cap and then opened by actuation of said valve mechanism by a vacuum from a vacuum source.

3. An ink jet recording head according to claim 1 wherein a filter is arranged near said valve mechanism.

4. An ink jet recording head according to claim 1 wherein said valve mechanism and said nozzle are constructed to effect vacuum suction.

5. An ink jet recorder comprising:
- an ink jet recording head including a nozzle for discharging ink, an ink chamber for supplying ink to said nozzle and a valve mechanism actuated by a vacuum arranged in said ink chamber, wherein an air layer is created in said ink chamber as ink is supplied thereto;

a cap mechanism for closing said nozzle; and an air evacuation joint mechanism connected to a vacuum source for closing a vent hole that connects said vacuum source and said ink chamber through said valve mechanism.

6. An ink jet recorder according to claim 5 wherein the vacuum source is connected to said cap mechanism.

7. An ink jet recorder according to claim 6 wherein the vacuum suction path between said ink chamber and the vacuum source through said valve mechanism and said cap mechanism is switchable.

8. An ink jet recorder according to claim 5 wherein an exhaust ink reservoir is connected to the vacuum source.

9. An ink jet recorder according to claim 5 wherein said cap mechanism and said air evacuation joint mechanism are constructed in union.

10. An ink jet recording head according to claim 1, wherein said valve mechanism has an open position and a closed position and is caused to open by the vacuum.

11. An ink jet recording head according to claim 5, wherein said valve mechanism has an open position and a closed position and is caused to open by the vacuum.

* * * * *